United States Patent
Issaev et al.

(10) Patent No.: US 7,927,739 B2
(45) Date of Patent: Apr. 19, 2011

(54) NON-AQUEOUS ELECTROCHEMICAL CELLS

(75) Inventors: Nikolai N. Issaev, Woodbridge, CT (US); Michael Pozin, Brookfield, CT (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 12/137,100

(22) Filed: Jun. 11, 2008

(65) Prior Publication Data

US 2008/0261110 A1 Oct. 23, 2008

Related U.S. Application Data

(60) Division of application No. 10/361,945, filed on Feb. 10, 2003, now abandoned, which is a continuation-in-part of application No. 10/022,289, filed on Dec. 14, 2001, now abandoned.

(51) Int. Cl.
*H01M 6/04* (2006.01)
*H01M 4/02* (2006.01)
*H01M 4/13* (2006.01)
*H01M 4/00* (2006.01)
*H01M 4/50* (2006.01)
*H01M 8/04* (2006.01)

(52) U.S. Cl. ........ 429/199; 429/188; 429/224; 429/221; 429/211; 429/245

(58) Field of Classification Search .................. 429/188, 429/199, 211, 221, 224, 245
See application file for complete search history.

(56) References Cited

U.S. PATENT DOCUMENTS

| | | |
|---|---|---|
| 345,124 A | 7/1886 | DeVirloy |
| 2,993,946 A | 7/1961 | Lozier |
| 3,732,124 A | 5/1973 | Cailley |
| 3,761,314 A | 9/1973 | Cailley |
| 3,905,851 A | 9/1975 | Davis, Jr. |
| 4,129,691 A | 12/1978 | Broussely |
| 4,279,972 A | 7/1981 | Moses |
| 4,401,735 A | 8/1983 | Moses et al. |
| 4,499,160 A | 2/1985 | Babai et al. |
| 4,526,846 A | 7/1985 | Kearney et al. |
| 4,529,675 A | 7/1985 | Sugalski |
| 4,555,457 A | 11/1985 | Dhanji |
| 4,755,440 A | 7/1988 | Peled et al. |
| 4,803,137 A | 2/1989 | Miyazaki et al. |
| 4,863,817 A | 9/1989 | Ogino et al. |
| 4,865,932 A | 9/1989 | Masuda et al. |
| 4,925,751 A | 5/1990 | Shackle et al. |

(Continued)

FOREIGN PATENT DOCUMENTS

CA 2336323 6/1999

(Continued)

OTHER PUBLICATIONS

Yang et al., "Aluminum Corrosion in Lithium Batteries an Investigation Using the Electrochemical Quartz Crystal Microbalance", Journal of the Electrochemical Society, vol. 147, No. 12, 4399-4407, 2000.

(Continued)

*Primary Examiner* — Gregg Cantelmo
*Assistant Examiner* — Eugenia Wang
(74) *Attorney, Agent, or Firm* — Fish & Richardson P.C.

(57) ABSTRACT

An electrochemical secondary cell is disclosed. The cell includes a cathode, an anode, a cathode current collector including stainless steel, and an electrolyte containing a perchlorate salt and a second salt.

6 Claims, 9 Drawing Sheets

U.S. PATENT DOCUMENTS

| | | | | |
|---|---|---|---|---|
| 4,957,833 | A | 9/1990 | Daifuku et al. | |
| 4,971,868 | A | 11/1990 | Tucholski et al. | |
| 5,077,152 | A | 12/1991 | Yoshino et al. | |
| 5,114,811 | A | 5/1992 | Ebel et al. | |
| 5,176,968 | A | 1/1993 | Blasi et al. | |
| 5,204,196 | A | 4/1993 | Yokomichi et al. | |
| 5,225,296 | A | 7/1993 | Ohsawa et al. | |
| 5,240,794 | A | 8/1993 | Thackeray et al. | |
| 5,272,022 | A | 12/1993 | Takami et al. | |
| 5,278,005 | A | 1/1994 | Yamauchi et al. | |
| 5,418,084 | A | 5/1995 | Georgopoulos | |
| 5,462,820 | A | 10/1995 | Tanaka | |
| 5,523,073 | A | 6/1996 | Sumida et al. | |
| 5,541,022 | A | 7/1996 | Mizumoto et al. | |
| 5,554,462 | A | 9/1996 | Flandrois et al. | |
| 5,567,548 | A | 10/1996 | Walk et al. | |
| 5,569,558 | A | 10/1996 | Takeuchi et al. | |
| 5,580,683 | A | 12/1996 | Takeuchi et al. | |
| 5,595,841 | A | 1/1997 | Suzuki | |
| 5,639,577 | A | 6/1997 | Takeuchi et al. | |
| 5,654,114 | A * | 8/1997 | Kubota et al. | 429/338 |
| 5,691,081 | A | 11/1997 | Krause et al. | |
| 5,750,277 | A | 5/1998 | Vu et al. | |
| 5,773,734 | A | 6/1998 | Young | |
| 5,811,205 | A | 9/1998 | Andrieu et al. | |
| 5,834,133 | A * | 11/1998 | Narukawa et al. | 429/171 |
| 5,851,693 | A | 12/1998 | Sano et al. | |
| 5,958,625 | A | 9/1999 | Rao | |
| 5,989,745 | A * | 11/1999 | Kamauchi et al. | 429/223 |
| 6,001,509 | A | 12/1999 | Kim et al. | |
| 6,017,656 | A | 1/2000 | Crespi et al. | |
| 6,025,096 | A | 2/2000 | Hope | |
| 6,030,422 | A | 2/2000 | Pyszczek | |
| 6,030,728 | A | 2/2000 | Cotte et al. | |
| 6,045,950 | A | 4/2000 | Chang | |
| 6,053,953 | A | 4/2000 | Tomiyama et al. | |
| 6,090,506 | A | 7/2000 | Inoue et al. | |
| 6,106,977 | A * | 8/2000 | Kobayashi et al. | 429/231.95 |
| 6,165,644 | A | 12/2000 | Nimon et al. | |
| 6,168,889 | B1 | 1/2001 | Dix et al. | |
| 6,190,803 | B1 | 2/2001 | Tomiyama et al. | |
| 6,218,055 | B1 | 4/2001 | Shah et al. | |
| 6,287,719 | B1 * | 9/2001 | Bailey | 429/94 |
| 6,316,145 | B1 * | 11/2001 | Kida et al. | 429/231.5 |
| 6,322,928 | B1 | 11/2001 | Thackeray et al. | |
| 6,352,793 | B2 | 3/2002 | Kitoh et al. | |
| 6,447,957 | B1 | 9/2002 | Sakamoto et al. | |
| 6,506,516 | B1 | 1/2003 | Wietelmann et al. | |
| 6,521,374 | B1 * | 2/2003 | Nakanishi et al. | 429/178 |
| 6,689,511 | B2 | 2/2004 | Yamada et al. | |
| 6,780,543 | B2 | 8/2004 | Yoshimura et al. | |
| 7,285,356 | B2 | 10/2007 | Issaev et al. | |
| 2001/0018146 | A1 * | 8/2001 | Shin et al. | 429/61 |
| 2001/0028871 | A1 | 10/2001 | Harrison et al. | |
| 2001/0033964 | A1 | 10/2001 | Heider et al. | |
| 2002/0028389 | A1 | 3/2002 | Sonoda et al. | |
| 2002/0136949 | A1 * | 9/2002 | Gan et al. | 429/212 |
| 2003/0113622 | A1 | 6/2003 | Blasi et al. | |
| 2003/0124421 | A1 | 7/2003 | Issaev et al. | |
| 2003/0143112 | A1 | 7/2003 | Suslick et al. | |
| 2003/0186110 | A1 | 10/2003 | Sloop | |
| 2004/0005267 | A1 | 1/2004 | Boryta et al. | |
| 2004/0053138 | A1 | 3/2004 | Otterstedt et al. | |
| 2004/0096746 | A1 | 5/2004 | Wietelmann et al. | |
| 2005/0019670 | A1 | 1/2005 | Amine et al. | |
| 2005/0191545 | A1 | 9/2005 | Bowles et al. | |
| 2005/0202320 | A1 | 9/2005 | Totir et al. | |
| 2006/0216597 | A1 | 9/2006 | Boczer et al. | |

FOREIGN PATENT DOCUMENTS

| | | |
|---|---|---|
| EP | 0 138 056 | 9/1984 |
| EP | 0 262 846 | 9/1987 |
| EP | 0 270 264 | 11/1987 |
| EP | 0 441 589 A1 | 8/1991 |
| EP | 0391720 | 6/1995 |
| EP | 0 852 072 B1 | 9/1999 |
| FR | 1415519 | 9/1965 |
| JP | 63-241867 | 10/1988 |
| JP | 1-227990 | 1/1989 |
| JP | 02-056849 | 2/1990 |
| JP | 02-204976 | 8/1990 |
| JP | HEI 3-84858 | 4/1991 |
| JP | 05-013105 | 1/1993 |
| JP | HEI 5-174873 | 7/1993 |
| JP | 07037572 A | 2/1995 |
| JP | HEI 7-37572 | 2/1995 |
| JP | HEI 8-64237 | 3/1996 |
| JP | 09-050823 | 2/1997 |
| JP | HEI 9-45373 | 2/1997 |
| JP | HEI 9-50823 | 2/1997 |
| JP | 09-270272 | 10/1997 |
| JP | HEI 10-50272 | 2/1998 |
| JP | 10-116633 | 5/1998 |
| JP | 10-208725 | 7/1998 |
| JP | HEI 10-189007 | 7/1998 |
| JP | 11-195410 | 7/1999 |
| JP | HEI 11-214016 | 8/1999 |
| JP | P2000-12044 A | 1/2000 |
| JP | 1-281676 | 5/2000 |
| JP | 2001-143753 | 5/2001 |
| JP | 2003-249208 | 9/2003 |
| WO | WO88/03331 | 5/1988 |
| WO | WO90/11999 | 10/1990 |
| WO | WO97/11504 | 3/1997 |
| WO | WO 98/40923 * | 9/1998 |
| WO | WO99/30381 | 6/1999 |
| WO | WO00/55935 | 9/2000 |
| WO | WO 01/80621 A2 | 11/2001 |
| WO | WO 01/80621 A3 | 11/2001 |

OTHER PUBLICATIONS

Morita et al., "Lithium Cycling Efficiency on the Aluminum Substrate in Blended Sulfolane-Ether Systems", J. Electrochem. Soc.:Electrochemical Science and Technology, vol. 134, No. 11, pp. 2665-2669, Nov. 1997.

Matsuda et al., "Organic Electrolyte Solutions for Rechargeable Lithium Batteries", Journal of Power Sources, 20 (1987) 273-278.

Linden, D., Handbook of Batteries, McGraw-Hill, Inc., 1995 "12.1 General Characteristics", pp. 12.1-12.16.

Linden, D., Handbook of Batteries and Fuel Cells, McGraw-Hill, Inc., 1984 "11.13 Lithium/Bismuth Oxide Cells", pp. 11.79-11.80.

Linden, D., Handbook of Batteries, McGraw-Hill, Inc., 1995 "1.4 Classification of Cells and Batteries", pp. 1.9-1.11; "7.1 General Characteristics and Applications of Primary Batteries", pp. 7.3-7.7; "23.1 General Characteristics and Applications of Secondary Batteries", pp. 23.3-23.12.

Linden, D., "Rechargeable Lithium Batteries", Handbook of Batteries, pp. 36.13-36.16, Undated.

"Lithium-bis(oxalate)borate: A Halogen-Free Conducting Salt for Lithium Batteries", Version 2.0/Mar. 2001 (11 pages).

Product Information, 3M Fluorad Lithium (Bis) Trifluoromethanesulfonimide Battery Electrolyte HQ-115, Sep. 1997.

Xu, W. et al., "LiBOB and Its Derivatives: Weakly Coordinating Anions, and the Exceptional Conductivity of Their Nonaqueous Solutions", *Electrochemical and Solid-State Letters*, 4 (1) E1-E4 (2001).

Xu, K. et al., "LiBOB as Salt for Lithium-Ion Batteries: A Possible Solution for High Temperature Operation", *Electrochemical and Solid-State Letters*, 5 (1) A26-A29 (2002).

Xu, K. et al., "Lithium Bis(oxalate)borate Stabilizes Graphite Anode in Propylene Carbonate", *Electrochemical and Solid-State Letters*, 5 (11) A259-A262 (2002).

Falk, S.U., *Alkaline Storage Batteries*, John Wiley & Sons, Inc. (New York, NY), 1969, pp. 1-41.

Wang, X. et al., "Inhibition of Anodic Corrosion of Aluminum Cathode Current Collector on Recharging in Lithium Imide Electrolytes", *Electrochimica Acta* 45 (2000) 2677-2684.

Aluminum 1145-O Available Web Site: http://www.matweb.com/search/SpecificMaterialPrint.asp?bassnum=MA1140 Retrieved from the Internet prior to the filing of the application.

Aluminum 7075-O Available Web Site: http://www.matweb.com/search/SpecificMaterialPrint.asp?bassnum=MA7070 Retrieved from the Internet prior to the filing of the application.

Aluminum 6061-O Available Web Site: http://www.matweb.com/search/SpecificMaterialPrint.asp?bassnum=MA6010 Retrieved from the Internet prior to the filing of the application.

Allegheny Ludlum Type 316L Stainless Steel, UNS S31603 Available Web Site: http://www.matweb.com/search/SpecificMaterialPrint.asp?bassnum=NL316L Retrieved from the Internet prior to the filing of the application.

Aluminum 2024-O Available Web Site: http://www.matweb.com/search/SpecificMaterialPrint.asp?bassnum=MA2240 Retrieved from the Internet prior to the filing of the application.

List of References [online], 93 pages. Retrieved from: the Thomson Derwent World Patent Index. Retrieved prior to the filing of the application, 2003.

List of References [online], 4 pages. Retrieved from: the Thomson Derwent World Patent Index. Retrieved prior to the filing of the application, 2003.

List of References [online], 31 pages. Retrieved from: the Thomson Derwent World Patent Index. Retrieved prior to the filing of the application, 2003.

List of References [online], 10 pages. Retrieved from: the Thomson Derwent World Patent Index. Retrieved prior to the filing of the application, 2003.

List of References [online], 5 pages. Retrieved from: the Thomson Derwent World Patent Index. Retrieved prior to the filing of the application, 2003.

List of References [online], 61 pages. Retrieved from: the Thomson Derwent World Patent Index. Retrieved prior to the filing of the application, 2003.

List of References [online], 2 pages. Retrieved from: the Thomson Derwent World Patent Index. Retrieved prior to the filing of the application, 2003.

Machine Translation of JP07037572, Jul. 22, 1993.

* cited by examiner

Al Electrode. CV (50 mv/s.).
Electrolyte: LiTFS, DME:EC:PC, LiClO$_4$.

FIG. 3

Al Electrode. $E_{Al}$=3.6 V (vs. Li RE).
Electrolyte: LiTFS, DME:EC:PC, LiClO$_4$.

FIG. 4

Al Electrode, $E^{Al}$=4.2 V (vs. Li RE)
Electrolyte: LiTFS, DME:EC:PC, LiClO$_4$ -10000 ppm

FIG. 5

Al Electrode. CV (50 mV/s.).
Electrolyte: LiTFS + LiTFSI, DME:EC:PC, LiClO$_4$.

FIG. 6

Al Electrode. $E_{Al}$=3.6 V (vs. Li RE).
Electrolyte: LiTFS + LiTFSI, DME:EC:PC, LiClO$_4$.

FIG. 7

Al Electrode. CV (50 mV/s.).
Electrolyte: LiTFS + LiPF$_6$, DME:EC:PC, LiClO$_4$.

FIG. 8

Al electrode. $E^{Al}$=3.6 V (vs. Li RE)
Electrolyte: LiTFS + LiPF$_5$, DME:EC:PC, LiClO$_4$.

FIG. 9

Al Electrode. CV (50 mv/s.). Electrolyte:
LiTFS, DME:EC:PC. Additives: LiClO$_4$, or Al(ClO$_4$)$_3$.

Electrodes: 304L SS, 316L SS. CV (50 mV/s.)
Electrolyte: LiTFS, DME:EC:PC, $LiClO_4$.

FIG. 12

Electrode: 304L SS.
E = 4.2 V (vs. Li RE).
Electrolyte: LiTFS, DME:EC:PC, $LiClO_4$.

FIG. 13

Electrode: 416 SS. CV (50 mV/s.)
Electrolyte: LiTFS, DME:EC:PC, LiClO$_4$.

FIG. 14

Electrode: 416 SS. E = 4.0 V (vs. Li RE)
Electrolyte: LiTFS, DME:EC:PC, LiClO$_4$.

FIG. 15

Electrode: 416 SS.
Cronoamperometry (50 hours). E = 4.0 V (vs. Li RE)
Electrolyte: LiTFS, DME:EC:PC, LiClO$_4$.

FIG. 16

Electrode: 1008 CRS.
Cronoamperometry (16 hours). E = 3.6 V (vs. Li RE)
Electrolyte: LiTFS, DME:EC:PC, LiClO$_4$.

NON-AQUEOUS ELECTROCHEMICAL CELLS

CROSS-REFERENCE TO RELATED APPLICATIONS

This application is a divisional application of and claims priority to U.S. Ser. No. 10/361,945, filed Feb. 10, 2003, now abandoned, which is a continuation-in-part application of U.S. Ser. No. 10/022,289, filed Dec. 14, 2001, now abandoned, hereby incorporated by reference in their entirety.

FIELD OF THE INVENTION

The invention relates to non-aqueous electrochemical cells.

BACKGROUND

Batteries are commonly used electrical energy sources. A battery contains a negative electrode, typically called the anode, and a positive electrode, typically called the cathode. The anode contains an active material that can be oxidized; the cathode contains or consumes an active material that can be reduced. The anode active material is capable of reducing the cathode active material.

When a battery is used as an electrical energy source in a device, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

In certain embodiments, the battery includes a metal as a construction material. For example, the metal can be used to construct a battery container (or can) or a current collector for the positive electrode. Sometimes, the metal can corrode because the electrode potential of the metal is lower than the normal operating potential of the positive electrode of the battery. When the metal is coupled with different metals in the environment of an electrochemical cell, the metal can also be susceptible to corrosion. Corrosion can increase the internal impedance of a cell, leading to capacity loss and to a decrease in specific energy. Corrosion can also limit the choice of metals available as a construction material.

SUMMARY

The invention relates to an electrochemical cell that includes parts made from metals, such as steels (e.g., stainless steels), aluminum, or an aluminum-based alloy; these parts contact the electrolyte of the cell. The cell also includes an additive to suppress corrosion of the parts.

In one aspect, the invention features an electrochemical cell, including a cathode, an anode, a cathode current collector comprising steel, and an electrolyte comprising a perchlorate salt and a second salt, wherein the electrochemical cell is a secondary cell. The cathode current collector can include a stainless steel.

In another aspect, the invention features an electrochemical cell including a cathode, an anode, a cathode current collector including steel, and an electrolyte containing a perchlorate salt and a second salt, wherein the electrochemical cell is a primary cell.

In another aspect, the invention features an electrochemical cell including a cathode, an anode, an electrolyte comprising a perchlorate salt, a first portion comprising a steel, and a second portion in electrical contact with the first portion, wherein the first and second portions are in electrical contact with the cathode.

The first portion can include a stainless steel, such as a 200 series stainless steel, a 300 series stainless steel, a 400 series stainless steel, or a cold roll steel. The first portion can be defined by a cathode current collector, a container of the cell, a tab, a rivet, or a contact plate. The first portion can have at least one dimension greater than 0.5 mm, e.g., greater than 1 mm, or greater than 2 mm. The first and second portions can physically contact each other.

The second portion can include a steel, e.g., a stainless steel. The second portion can include a composition different from or the same as a composition of the first portion.

The cell can be a primary cell or a secondary cell. Primary electrochemical cells are meant to be discharged to exhaustion only once, and then discarded. Primary cells are not meant to be recharged. Secondary cells can be recharged for many times, e.g., more than fifty times, more than a hundred times, or more.

In another aspect, the invention features a method of reducing corrosion. The method includes adding a perchlorate salt to a non-aqueous solution. The method can further include placing the solution, a cathode, an anode, and a member including steel into an electrochemical cell.

The member can include a stainless steel, such as a 200 series stainless steel, a 300 series stainless steel, a 400 series stainless steel, or a cold roll steel.

Embodiments of the aspects of the invention can include one or more of the following features.

The steel can be a 200 series stainless steel, a 300 series stainless steel, a 400 series stainless steel, and a cold roll steel.

The perchlorate salt can include $LiClO_4$. The perchlorate salt can include $Ca(ClO_4)_2$, $Ba(ClO_4)_2$, $Al(ClO_4)_3$, $Mg(ClO_4)_2$, $KClO_4$, tetrabutylammonium perchlorate, or tetraethylammonium perchlorate.

The electrolyte can include between about 300 ppm and about 50,000 ppm by weight of the perchlorate salt, e.g., about 300 ppm to about 40,000 ppm, about 300 ppm to about 30,000 ppm, about 300 ppm to about 20,000 ppm, about 300 ppm to about 10,000 ppm, or about 300 ppm to about 5,000 ppm.

The details of one or more embodiments of the invention are set forth in the accompanying drawings and the description below. Other aspects, features, and advantages of the invention will be apparent from the description and drawings, and from the claims.

DETAILED DESCRIPTION

Figure 1:
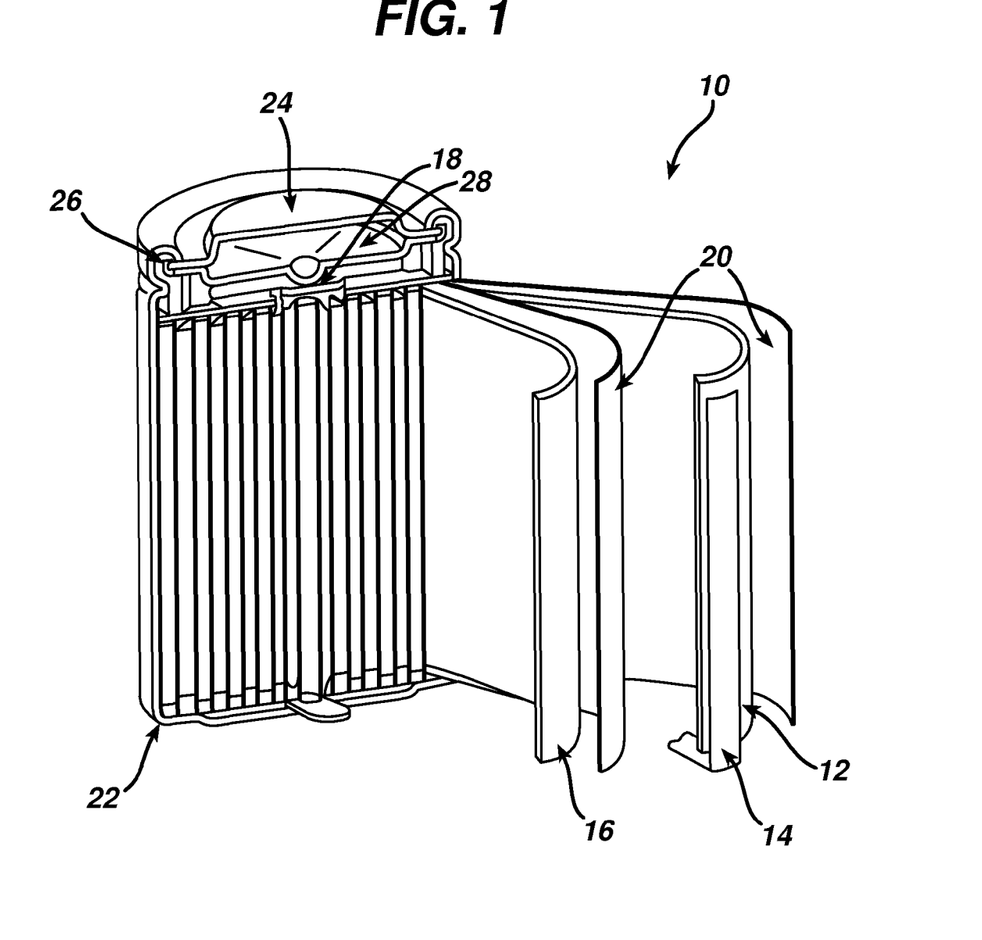
FIG. 1 is a sectional view of a nonaqueous electrochemical cell.

Referring to FIG. 1, an electrochemical cell 10 includes an anode 12 in electrical contact with a negative lead 14, a cathode 16 in electrical contact with a positive lead 18, a separator 20 and an electrolytic solution. Anode 12, cathode 16, separator 20 and the electrolytic solution are contained within a case 22. The electrolytic solution includes a solvent system and a salt that is at least partially dissolved in the solvent system.

Cathode 16 includes an active cathode material, which is generally coated on the cathode current collector. The current collector is generally titanium, stainless steel, nickel, aluminum, or an aluminum alloy, e.g., aluminum foil. The active material can be, e.g., a metal oxide, halide, or chalcogenide; alternatively, the active material can be sulfur, an organosulfur polymer, or a conducting polymer. Specific examples include cobalt oxides, MnO$_2$, manganese spinels, V$_2$O$_5$, CoF$_3$, molybdenum-based materials such as MoS$_2$ and MoO$_3$, FeS$_2$, SOCl$_2$, S, (C$_6$H$_5$N)$_n$, (S$_3$N$_2$)$_n$, where n is at least 2. The active material can also be a carbon monofluoride. An example is a compound having the formula CF$_x$, where x is 0.5 to 1.0, or higher. The active material can be mixed with a conductive material such as carbon and a binder such as polytetrafluoroethylene (PTFE). An example of a cathode is one that includes aluminum foil coated with MnO$_2$. The cathode can be prepared as described in U.S. Pat. No. 4,279,972. Specific cathode materials are a function of, e.g., the type of cell such as primary or secondary.

Anode 12 can consist of an active anode material, usually in the form of an alkali metal, e.g., Li, Na, K, or an alkaline earth metal, e.g., Ca, Mg. The anode can also consist of alloys of alkali metals and alkaline earth metals or alloys of alkali metals and Al. The anode can be used with or without a substrate. The anode also can consist of an active anode material and a binder. In this case an active anode material can include tin-based materials, carbon-based materials, such as carbon, graphite, an acetylenic mesophase carbon, coke, a metal oxide and/or a lithiated metal oxide. The binder can be, for example, PTFE. The active anode material and binder can be mixed to form a paste which can be applied to the substrate of anode 12. Specific anode materials are a function of, e.g., the type of cell such as primary or secondary.

Separator 20 can be formed of any of the standard separator materials used in nonaqueous electrochemical cells. For example, separator 20 can be formed of polypropylene, (e.g., nonwoven polypropylene or microporous polypropylene), polyethylene, and/or a polysulfone.

The electrolyte can be in liquid, solid or gel (polymer) form. The electrolyte can contain an organic solvent such as propylene carbonate (PC), ethylene carbonate (EC), dimethoxyethane (DME), butylene carbonate (BC), dioxolane (DO), tetrahydrofuran (THF), acetonitrile (CH$_3$CN), gamma-butyrolactone, diethyl carbonate (DEC), dimethyl carbonate (DMC), ethyl methyl carbonate (EMC) dimethylsulfoxide (DMSO) methyl acetate (MA), methyl formiate (MF), sulfolane or combinations thereof. The electrolyte can alternatively contain an inorganic solvent such as SO$_2$ or SOCl$_2$. The electrolyte also contains a lithium salt such as lithium trifluoromethanesulfonate (LiTFS) or lithium trifluoromethanesulfonimide (LiTFSI), or a combination thereof. Additional lithium salts that can be included are listed in U.S. Pat. No. 5,595,841, which is hereby incorporated by reference in its entirety. In some embodiments, the electrolyte may contain LiPF$_6$; in other embodiments, the electrolyte is essentially free of LiPF$_6$.

In preferred embodiments, the electrolyte also contains a perchlorate salt, which inhibits corrosion in the cell. Examples of suitable salts include lithium, barium, calcium, aluminum, sodium, potassium, magnesium, copper, zinc, ammonium, tetrabutylammonium, and tetraethylammonium perchlorates. Generally, at least 300 ppm by weight of the perchlorate salt is used; this ensures that there is enough salt to suppress corrosion. In addition, less than about 50,000 ppm by weight of the perchlorate salt is generally used. If too much perchlorate salt is used, under certain conditions, the cell can be unsafe. In certain embodiments, greater than or equal to about 300 ppm, 500 ppm, 2,500 ppm, 5,000 ppm, 10,000 ppm, 15,000 ppm, 20,000 ppm, 25,000 ppm, 30,000 ppm, 35,000 ppm, 40,000 ppm, or 45,000 ppm by weight of the perchlorate salt is used. Alternatively or in addition, less than or equal to about 50,000 ppm, 45,000 ppm, 40,000 ppm, 35,000 ppm, 30,000 ppm, 25,000 ppm, 20,000 ppm, 15,000 ppm, 10,000 ppm, 5,000 ppm, 2,500 ppm, or 500 ppm by weight of the perchlorate is used. An effective amount of perchlorate to reduce, e.g., inhibit, corrosion to a desired level in the cell can be determined experimentally, e.g., using cyclic voltammetry.

In some embodiments, cell 10 includes an electrolyte formed of a mixture of solvents having DME and PC, and a salt mixture of LiTFS and LiTFSI. The concentration of DME in the mixture of solvents can range from about 30% to about 85% by weight. The concentration of DME in the mixture of solvents can be equal to or greater than 30%, 35%, 40%, 45%, 50%, 55%, 60%, 65%, 70%, 75%, or 80% by weight; and/or equal to or less than 85%, 80%, 75%, 70%, 65%, 60%, 55%, 50%, 45%, 40%, or 35% by weight. The concentration of PC in the mixture of solvents can be equal to 100% minus the concentration of DME. For example, if the concentration of DME in the mixture of solvents is 75% by weight, then the concentration of PC in the mixture of solvents is 25% by weight. If the concentration of DME in the mixture of solvents is 50%-75% by weight, then the concentration of PC in the mixture of solvents is 25%-50% by weight.

For the LiTFS and LiTFSI salt mixture, the total concentration of salt in the mixture of solvents can range from about 0.4 M to about 1.2 M. The total concentration of LiTFS and LiTFSI in the mixture of solvents can be equal to or greater than 0.40 M, 0.45 M, 0.50 M, 0.55 M, 0.60 M, 0.65 M, 0.70 M, 0.75 M, 0.80 M, 0.85 M, 0.90 M, 0.95 M, 1.00 M, 1.05 M, 1.10 M, or 1.15 M; and/or equal to or less than 1.2 M, 1.15 M, 1.10 M, 1.05 M, 1.00 M, 0.95 M, 0.90 M, 0.85 M, 0.80 M, 0.75 M, 0.70 M, 0.65 M, 0.60 M, 0.55 M, 0.50 M, or 0.45 M. Of the total concentration of salt, the concentration of LiTFS in the mixture of solvents can be (in mole fraction) equal to or greater than 5%, 10%, 15%, 20%, 25%, 30%, 35%, 40%, 45%, 50%, 55%, 60%, 65%, 70%, 75%, 80%, 85%, 90%, 95%, or 100%; and/or equal to or less than 95%, 90%, 85%, 80%, 75%, 70%, 65%, 60%, 55%, 50%, 45%, 40%, 35%, 30%, 25%, 20%, 15%, 10%, or 5%. The concentration of LiTFSI in the mixture of solvents can be equal to 100% minus the concentration of LiTFS in the mixture of solvents. For example, if the total concentration of salt in the mixture of solvents is 0.5 M, and the LiTFS concentration (in mole fraction) in the mixture of solvents is 90% (i.e., 0.45 M), then the LiTFSI concentration in the electrolyte mixture is 10% (i.e., 0.05 M). In embodiments, other types of salts can be added to the electrolyte.

Other materials can be added to the electrolyte mixture. For example, in certain embodiments, cell 10 includes an electrolyte formed of a mixture of solvents including EC, DME and PC, and a salt mixture of LiTFS and LiTFSI. The concentration of EC in the mixture of solvents can be between about 5% and 30% by weight. The concentration of EC in the mixture of solvents can be equal to or greater than 5%, 10%, 15%, 20%, or 25% by weight; and/or equal to or less than 30%, 25%, 20%, 15%, or 10% by weight. The concentration of DME in the mixture of solvents can range from about 30% to about 85% by weight. The concentration of DME in the mixture of solvents can be equal to or greater than 30%, 35%, 40%, 45%, 50%, 55%, 60%, 65%, 70%, 75%, or 80% by weight; and/or equal to or less than 85%, 80%, 75%, 70%, 65%, 60%, 55%, 50%, 45%, 40%, or 35% by weight. The concentration of PC in the mixture of solvents can be equal to 100% minus the concentration of EC and DME. For example, if the concentration of EC in the mixture of solvents is 15% by weight, and the concentration of DME in the mixture of solvents is 60% by weight, then the concentration of PC in the mixture of solvents is 25% by weight. Examples of an EC:DME:PC solvent mixture are 14:62:24 and 10:75:15 percent by weight.

The LiTFS and LiTFSI concentrations in the electrolyte, e.g., 0.4-1.2 M, can be generally similar to those described herein. In embodiments, other types of salts can be added to the electrolyte.

To assemble the cell, separator 20 can be cut into pieces of a similar size as anode 12 and cathode 16 and placed therebetween as shown in FIG. 1. Anode 12, cathode 16, and separator 20 are then placed within case 22, which can be made of a metal such as nickel, nickel plated steel, stainless steel, aluminum alloy, or aluminum, or a plastic such as polyvinyl chloride, polypropylene, polysulfone, ABS or a polyamide. Case 22 is then filled with the electrolytic solution and sealed. One end of case 22 is closed with a cap 24 and an annular insulating gasket 26 that can provide a gas-tight and fluid-tight seal. Positive lead 18, which can be made of aluminum, nickel, titanium, steel or stainless steel, connects cathode 16 to cap 24. Cap 24 may also be made of aluminum, nickel, titanium, steel or stainless steel. A safety valve 28 is disposed in the inner side of cap 24 and is configured to decrease the pressure within battery 10 when the pressure exceeds some predetermined value. Additional methods for assembling the cell are described in U.S. Pat. Nos. 4,279,972; 4,401,735; and 4,526,846.

Other configurations of battery 10 can also be used, including, e.g., the coin cell configuration. The batteries can be of different voltages, e.g., 1.5V, 3.0V, or 4.0V.

The invention is further described in the following examples, which do not limit the scope of the invention described in the claims.

EXAMPLE 1

Al Corrosion in Different Electrolytes with Addition of $LiClO_4$

Glass Cell Experimentation

An electrochemical glass cell was constructed having an Al working electrode, a Li reference electrode, and two Li auxiliary electrodes. The working electrode was fabricated from a 99.999% Al rod inserted into a Teflon sleeve to provide a planar electrode area of 0.33 $cm^2$. The native oxide layer was removed by first polishing the planar working surface with 3 μm aluminum oxide paper under an argon atmosphere, followed by thorough rinsing of the Al electrode in electrolyte. All experiments were performed under an Ar atmosphere.

Cyclic Voltammetry

Corrosion current measurements were made according to a modified procedure generally described in X. Wang et al., *Electrochemica Acta*, vol. 45, pp. 2677-2684 (2000). The corrosion potential of Al was determined by continuous cyclic voltammetry. In each cycle, the potential was initially set to an open circuit potential, then anodically scanned to +4.5 V and reversed to an open circuit potential. A scan rate of 50 mV/s was selected, at which good reproducibility of the corrosion potential of aluminum was obtained. The corrosion potential of aluminum was defined as the potential at which the anodic current density reached $10^{-5}$ $A/cm^2$ at the first cycle.

Chronoamperometry

Corrosion current measurements were made according to the procedure described in EP 0 852 072. The aluminum electrode was polarized at various potentials vs. a Li reference electrode while the current was recorded vs. time. Current vs. time measurements were taken during a 30-minute period. The area under current vs. time curve was used as a measure of the amount of aluminum corrosion occurring. The experiment also could be terminated in case the current density reached 3 $mA/cm^2$ before the 30-minute time period elapsed and no corrosion suppression occurred. Corrosion suppression occurred when the resulting current density was observed in the range of $10^{-6}$ $A/cm^2$.

Figure 2:
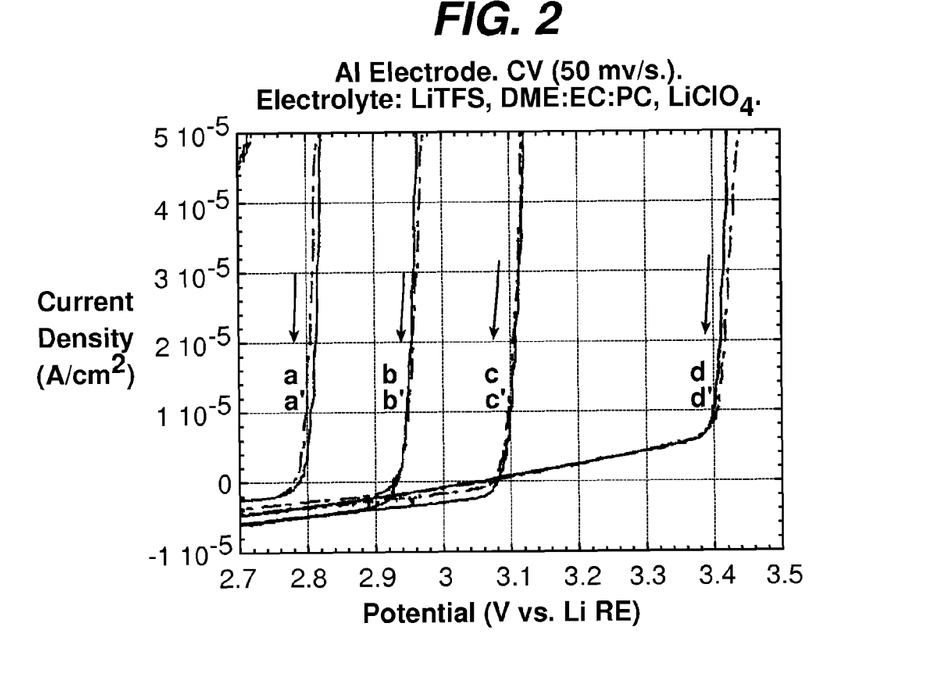
FIG. 2 is a graph showing current density vs. potential of the aluminum in an electrode exposed to LiTFS, DME:EC:PC electrolytes containing different amounts of $LiClO_4$.

Referring to FIG. 2, cyclic voltammograms taken in the electrolyte containing LiTFS and DME:EC:PC showed significant shifts in the corrosion potential of the Al electrode. The addition of $LiClO_4$ to the electrolyte shifted the potential of aluminum in the positive direction, which indicates corrosion suppression.

Curves "a" and "a'" in FIG. 2 show the corrosion potential of the aluminum in the electrolyte containing no $LiClO_4$. The addition of 500 ppm of $LiClO_4$ to the electrolyte shifted the potential of the aluminum 150 mV in the positive direction (curves "b" and "b'"); the addition of 1000 ppm of LiClO$_4$ to the electrolyte shifted the potential 300 mV (curves "c" and "C'"); and the addition of 2500 ppm of LiClO$_4$ to the electrolyte shifted the potential 600 mV (curves "d" and "d'"). These results demonstrate that the addition of increasing amounts of LiClO$_4$ to the electrolyte containing LiTFS salt and mixture of DME:EC:PC results in increasing degrees of corrosion protection of the aluminum electrode.

Figure 3:
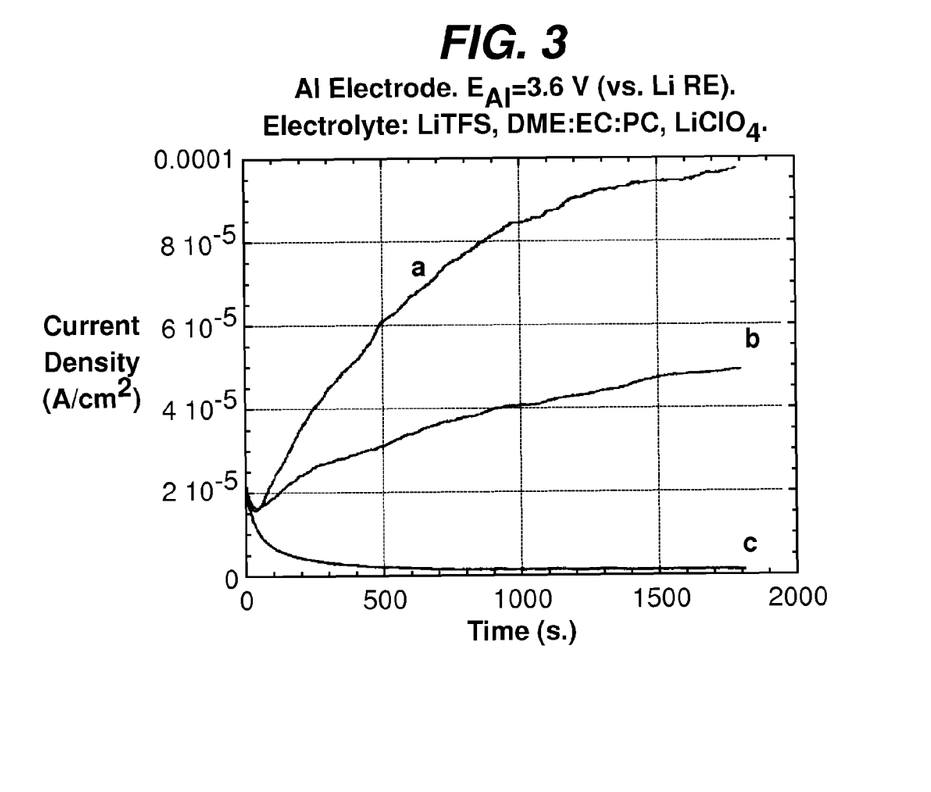
FIG. 3 is a graph showing current density vs. time of the aluminum in an electrode exposed to LiTFS, DME:EC:PC electrolytes containing different amounts of $LiClO_4$.

Referring to FIG. 3, curve "a" shows a potentiostatic dependence (chronoamperogram) of the aluminum electrode exposed to the electrolyte containing LiTFS, DME:EC:PC with the addition of 500 ppm LiClO$_4$; curve "b" shows the chronoamperogram taken in the same electrolyte with addition of 1000 ppm LiClO$_4$; curve "c" shows the chronoamperogram taken in the electrolyte containing LiTFS, DME:EC:PC, and 2500 ppm LiClO$_4$. As shown in FIG. 3, at a LiClO$_4$ concentration of 2500 ppm, the aluminum corrosion at +3.6 V (vs. a Li reference electrode) is effectively suppressed, and the corrosion current is less than $10^{-6}$ A/cm$^2$ after 30 minutes of measurement.

Figure 4:
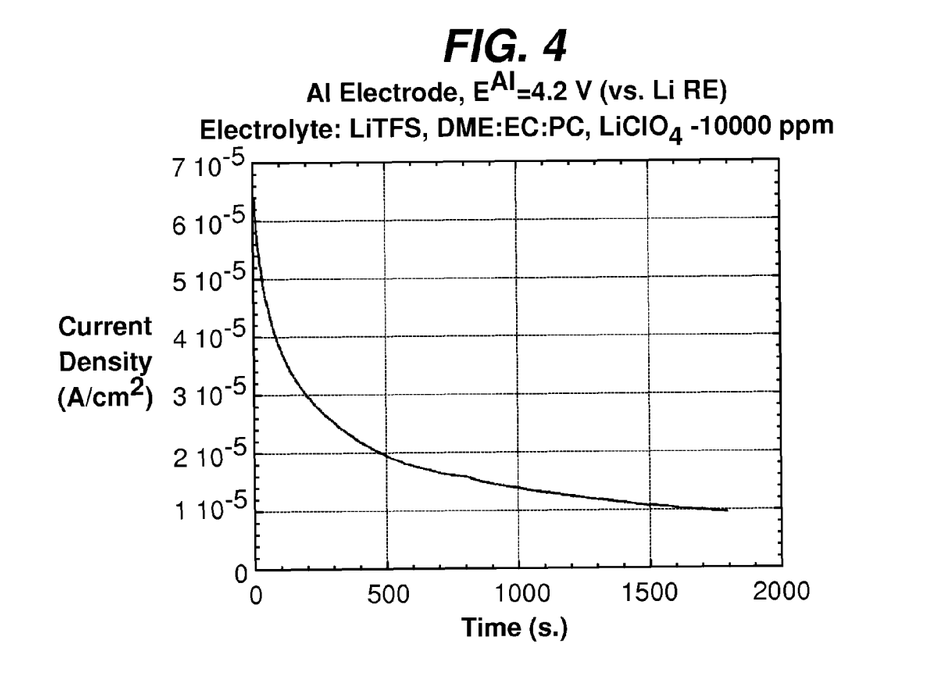
FIG. 4 is a graph showing current density vs. time of the aluminum in an electrode exposed to a LiTFS, DME:EC:PC electrolyte containing $LiClO_4$.

Referring to FIG. 4, the electrochemical window of Al stability can be extended as high as +4.2 V (vs. a Li reference electrode) by increasing the concentration of LiClO$_4$ to 1% (10,000 ppm). At a LiClO$_4$ concentration of 1%, aluminum corrosion is effectively suppressed at 4.2 V. The corrosion current after 30 minutes is 8-10 µA/cm$^2$, and the current continues to fall over time. The falling current indicates passivation of the Al surface. The increased level of the resulting current (10 µA/cm$^2$ vs. 1 µA/cm$^2$ after 30 minutes of experiment) is due to the increased background current at these potentials.

Figure 5:
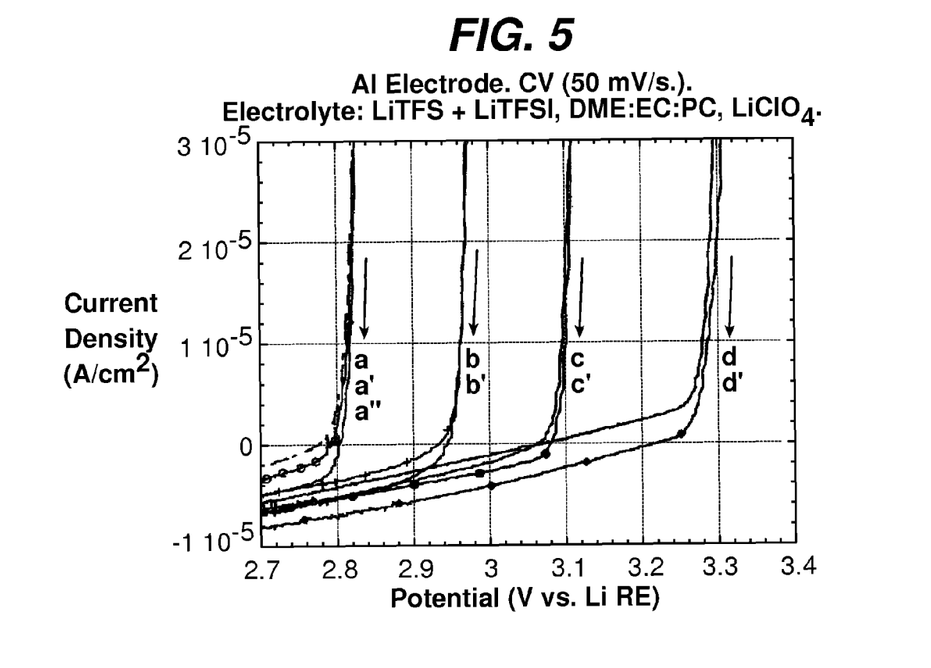
FIG. 5 is a graph showing current density vs. potential of the aluminum in an electrode exposed to LiTFS+LiTFSI, DME:EC:PC electrolytes containing different amounts of $LiClO_4$.

Referring to FIG. 5, curves "a", "a'", and "a''" show the corrosion potential of an aluminum electrode subjected to an electrolyte containing a mixture of LiTFS and LiTFSI salts, DME:EC:PC, and no LiClO$_4$. The addition of 500 ppm of LiClO$_4$ to this electrolyte shifted the corrosion potential of the aluminum 150 mV in the positive direction (curves "b" and "b'"); the addition of 1000 ppm of LiClO$_4$ to the electrolyte shifted the potential 280 mV (curves "c" and "c'"); and the addition of 2500 ppm of LiClO$_4$ to the electrolyte shifted potential 460 mV (curves "d" and "d'"). These results demonstrate that the addition of increasing amounts of LiClO$_4$ to the electrolyte containing the mixture of LiTFS and LiTFSI salts and DME:EC:PC results in increasing degrees of corrosion protection of the aluminum electrode.

Figure 6:
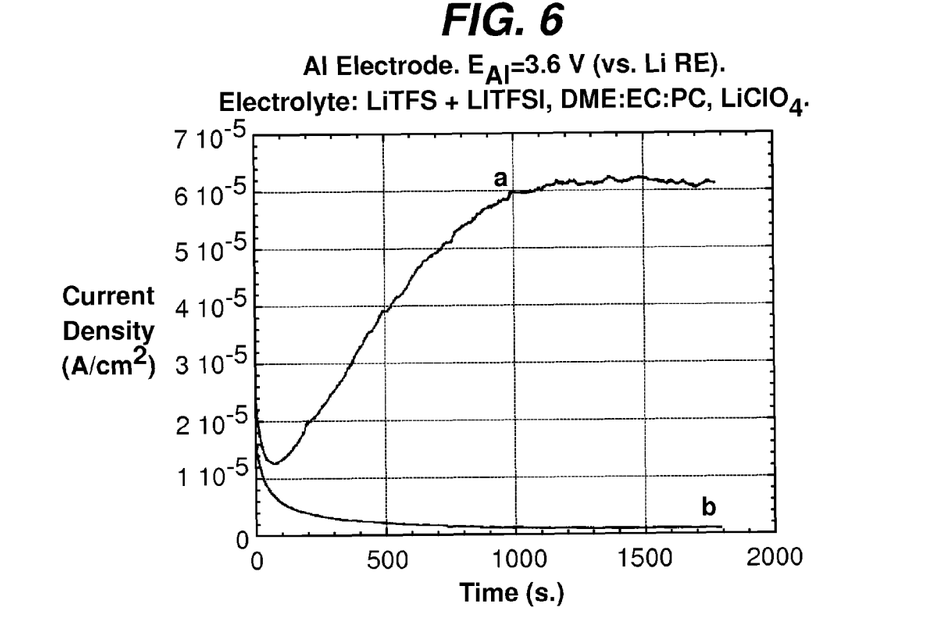
FIG. 6 is a graph showing current density vs. time of the aluminum in an electrode exposed to LiTFS+LiTFSI, DME: EC:PC electrolytes containing different amounts of LiClO$_4$.

Referring to FIG. 6, curve "a" shows the chronoamperogram of the aluminum electrode exposed to the electrolyte containing a mixture of LiTFS and LiTFSI salts, DME:EC:PC, and 1000 ppm LiClO$_4$; and curve "b" shows the chronoamperogram of the aluminum electrode exposed to the same electrolyte containing 2500 ppm LiClO$_4$. As shown in FIG. 5, at a LiClO$_4$ concentration of 2500 ppm in LiTFS, LiTFSI, DME:EC:PC electrolyte, the aluminum corrosion at +3.6 V is effectively suppressed, and resulting corrosion current of the Al electrode is about $10^{-6}$ A/cm$^2$ after 30 minutes.

Figure 7:
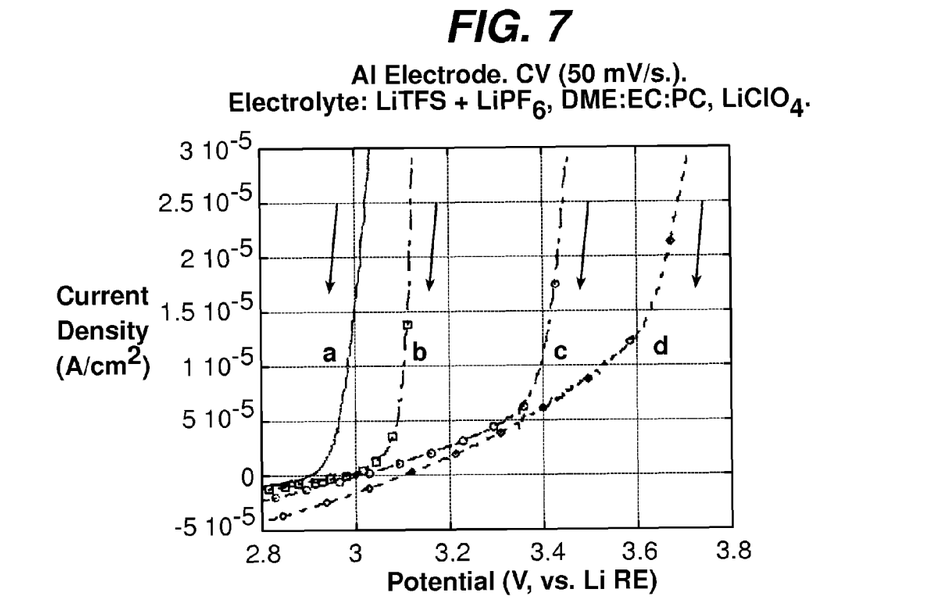
FIG. 7 is a graph showing current density vs. potential of the aluminum in an electrode exposed to LiTFS+LiPF$_6$, DME:EC:PC electrolytes containing different amounts of LiClO$_4$.

Referring to FIG. 7, curve "a" shows the corrosion potential of the aluminum subjected to an electrolyte containing a mixture of LiTFS and LiPF$_6$ salts, DME:EC:PC, and no LiClO$_4$. The addition of 500 ppm of LiClO$_4$ to this electrolyte shifted the corrosion potential of the aluminum 125 mV in the positive direction (curve "b"); the addition of 2500 ppm of LiClO$_4$ to the electrolyte shifted the potential 425 mV (curve "c"); and the addition of 5000 ppm of LiClO$_4$ to the electrolyte shifted the potential 635 mV (curve "d"). These results demonstrate that the addition of increasing amounts of LiClO$_4$ to the electrolyte containing the mixture of LiTFS, LiPF$_6$ salts, and DME:EC:PC results in increasing degrees of corrosion protection of the aluminum electrode.

Figure 8:
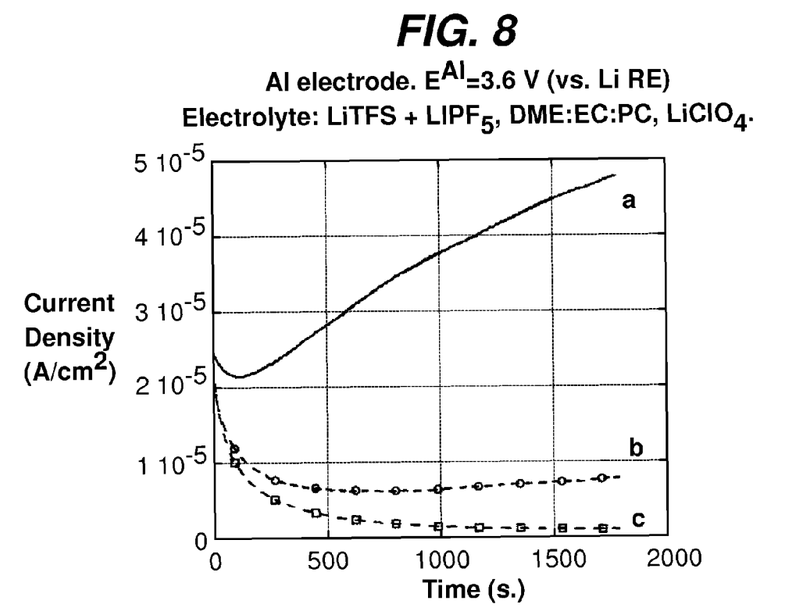
FIG. 8 is a graph showing current density vs. time of the aluminum in an electrode exposed to LiTFS+LiPF$_6$, DME: EC:PC electrolytes containing different amounts of LiClO$_4$.

Referring to FIG. 8, curve "a" shows a chronoamperogram of the aluminum electrode exposed to the electrolyte containing LiTFS, LiPF$_6$, DME:EC:PC with no LiClO$_4$; curve "b" shows a chronoamperogram taken in the same electrolyte with 2500 ppm LiClO$_4$ added; curve "c" shows a chronoamperogram taken in the electrolyte containing LiTFS, LiPF$_6$, DME:EC:PC, and 5000 ppm LiClO$_4$. As shown in FIG. 8, at a LiClO$_4$ concentration of 5000 ppm, the aluminum corrosion at +3.6 V (vs. a Li reference electrode) is effectively suppressed, and the corrosion current is less than $10^{-6}$ A/cm$^2$ after 30 minutes of measurement.

EXAMPLE 2

Al Corrosion in Electrolytes Containing LiTFS, DME:EC:PC, with the Addition of Different Perchlorates Electrochemical glass cells were constructed as described in Example 1. Cyclic voltammetry and chromoamperometry were performed as described in Example 1.

Figure 9:
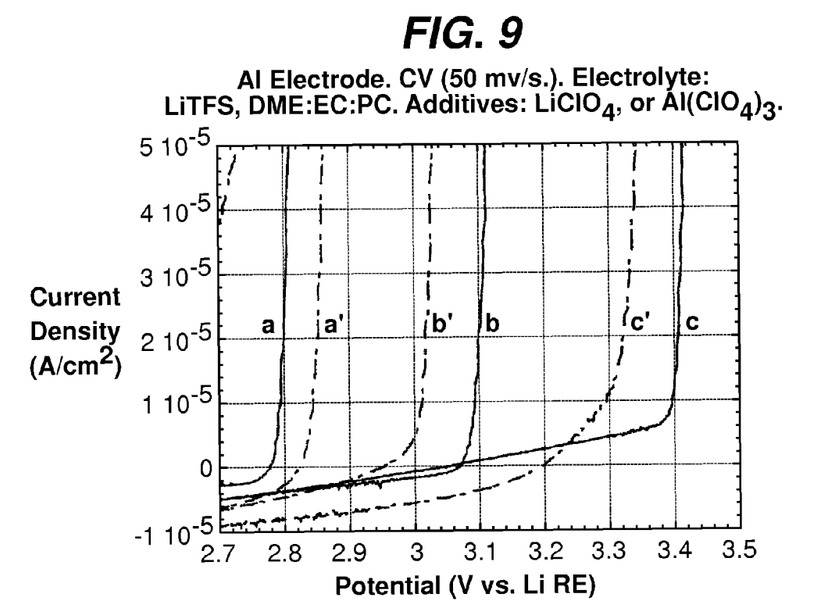
FIG. 9 is a graph showing current density vs. potential of the aluminum in an electrode exposed to a LiTFS, DME:EC: PC electrolyte containing different amounts of LiClO$_4$ and different amounts of Al(ClO$_4$)$_3$.

Referring to FIG. 9, curves "a", "b", and "c" show the corrosion potential of an aluminum electrode exposed to the electrolyte LiTFS, DME:EC:PC containing 0, 1000 and 2500 ppm of LiClO$_4$, respectively. Curves "a'", "b'," and "c'" show the corrosion potential of an aluminum electrode exposed to the electrolyte LiTFS, DME:EC:PC containing 0, 1000 and 2500 ppm of Al(ClO$_4$)$_3$, respectively. These results demonstrate that the addition of Al(ClO$_4$)$_3$ salt, like the addition of LiClO$_4$ salt, suppressed the corrosion of Al.

Figure 10:
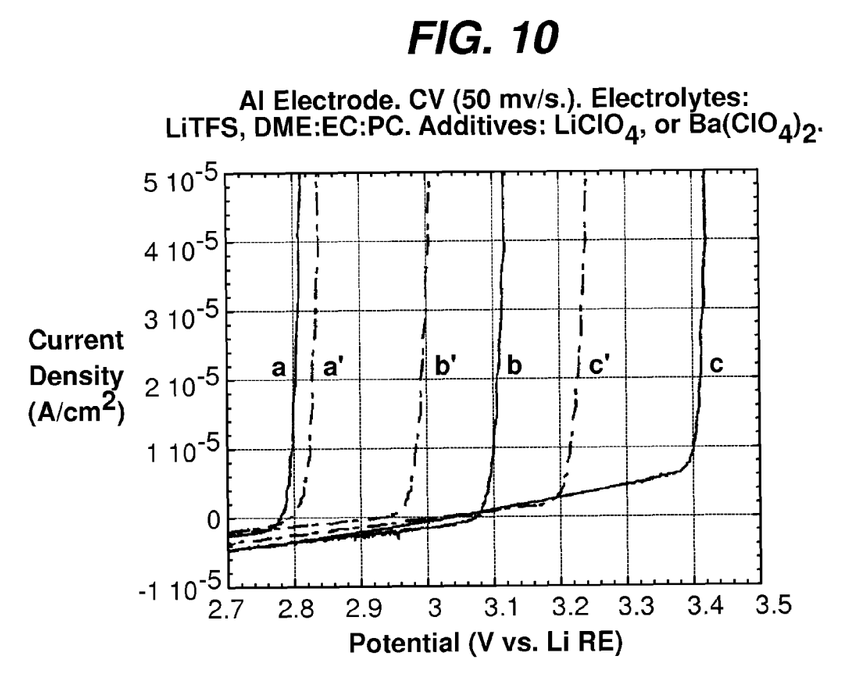
FIG. 10 is a graph showing current density vs. potential of the aluminum in an electrode exposed to a LiTFS, DME:EC: PC electrolyte containing different amounts of LiClO$_4$ and different amounts of Ba(ClO$_4$)$_2$.

Referring to FIG. 10, curves "a", "b", and "c" show the corrosion potential of an aluminum electrode exposed to the electrolyte LiTFS, DME:EC:PC containing 0, 1000 and 2500 ppm of LiClO$_4$, respectively. Curves "a'", "b'" and "c'" show the corrosion potential of an aluminum electrode exposed to the electrolyte LiTFS, DME:EC:PC containing 0, 1000 and 2500 ppm of Ba(ClO$_4$)$_2$, respectively. These results demonstrate that the addition of Ba(ClO$_4$)$_2$ salt, like the addition of LiClO$_4$ salt, suppressed the corrosion of Al.

The shifts in the corrosion potential that result from the addition of LiClO$_4$, Al(ClO$_4$)$_3$, and Ba(ClO$_4$)$_2$ to an electrolyte containing LiTFS and DME:EC:PC are summarized below in Table 1.

TABLE 1

| | Anodic shift of corrosion potential (mV) | | |
|---|---|---|---|
| Additive | 0 ppm | 1000 ppm | 2500 ppm |
| Al(ClO$_4$)$_3$ | 0 | 170 | 450 |
| Ba(ClO$_4$)$_2$ | 0 | 170 | 400 |
| LiClO$_4$ | 0 | 300 | 600 |

EXAMPLE 3

Al Corrosion in Electrolyte Containing LiTFS, DME:EC:PC, (Vial Storage Test)

The following test conditions were used:
  Electrodes: EMD (electrochemically synthesized manganese dioxide) based cathodes applied on the Al current collector
  Electrolyte (10 mL per sample): LiTFS, DME:EC:PC with and without addition of LiClO$_4$ salt Aging conditions: 60° C. for 20 days Direct determination of Al corrosion was performed in one of two ways:

Analytical determination of Al ions in the electrolyte after aging (ICP method)

Direct observation of the Al surface (optical microscopy) after aging

Measurements of Al corrosion were performed by measuring the Al ions in the electrolyte after aging of the EMD based cathodes with an Al current collector. Analytical results (ICP) are summarized in Table 2.

Table 2.

TABLE 2

| Sample | Electrolyte | Al concentration after storage (ppm) |
|---|---|---|
| None | LiTFS, DME:EC:PC | 1.94 ± 0.20 |
| EMD based cathode on Al current collector | LiTFS, DME:EC:PC | 21.55 ± 1.58 |
| EMD based cathode on Al current collector | LiTFS, DME:EC:PC + 2500 ppm LiClO$_4$ | 2.16 ± 0.18 |

The level of Al ions in the electrolyte indicates the rate of Al corrosion. As shown above, the background level of Al ions in solution is about 2 ppm. As referred to herein, the corrosion of a metal is said to be suppressed when, after the test described above is performed, the concentration of metal ions in the electrolyte is less than about 3 ppm, which is just above the background level.

The Al concentration in the electrolyte without LiClO$_4$ addition is high (the range is 19.4-23 ppm). Thus, part of the Al substrate has dissolved (corroded) under the potential of the applied active cathode material.

On the other hand, the samples which were stored in the electrolytes with added LiClO$_4$ did not show any corrosion (the resulting Al concentration in the electrolyte is at the background level 1.9-2.3 ppm). These data confirm results of the electrochemical measurements in a glass cell: 2500 ppm of LiClO$_4$ completely suppresses the corrosion of Al at the potential of the EMD cathode.

The analytical data were confirmed by the direct observation of Al surface after aging (under an optical microscope, at a magnification of 60×). The electrodes stored in the electrolyte without LiClO$_4$ exhibited substantial corrosion, as viewed under the optical microscope. The section stored in the electrolyte with added LiClO$_4$ showed virtually no corrosion.

EXAMPLE 4

Al Current Collector Coupled with Other Metals (Vial Storage Test)

The same cathodes on the Al substrate as described above were used in this experiment. In this case, the Al substrates were welded to stainless steel (SS) or nickel (Ni) tabs. A description of the samples and analytical results is presented in Table 3.

TABLE 3

| Sample | Electrolyte | Ni (ppm) | Al (ppm) | Fe (ppm) |
|---|---|---|---|---|
| None | LiTFS, DME:EC:PC | <1.0 | <1.0 | <1.0 |
| Cathode (Al cur. collector with welded SS tab) | LiTFS, DME:EC:PC | <1.0 | 24.4 | 5.3 |
| Cathode (Al cur. collector with welded Ni tab) | LiTFS, DME:EC:PC | 90.9 | 20.5 | <1.0 |
| Cathode (Al cur. collector with welded SS tab) | LiTFS, DME:EC:PC + 2500 ppm LiClO$_4$ | <1.0 | <1.0 | <1.0 |
| Cathode (Al cur. collector with welded Ni tab) | LiTFS, DME:EC:PC + 2500 ppm LiClO$_4$ | <1.0 | <1.0 | <1.0 |

The highest corrosion rate was observed on the sample welded to the SS tab and stored in the electrolyte without added LiClO$_4$ (the resulting solution contains the residue colored as a rust, and the SS tab is separated from the Al substrate). The presence of iron (5.3 ppm of Fe ions in the resulting electrolyte) indicates a high rate of SS corrosion as well as Al corrosion (24.4 ppm of the Al in the resulting electrolyte).

A high concentration of Ni (90.9 ppm) in the resulting electrolyte (Al current collector with welded Ni tab, electrolyte without LiClO$_4$) indicates the severe corrosion of the Ni tab coupled with Al (the Al corroded as well, as indicated by the presence of 20.5 ppm Al).

On the other hand, the samples stored in the electrolytes with added LiClO$_4$ did not show any corrosion (the resulting Al, Ni, Fe concentrations in the electrolyte were at the background level of <1 ppm).

EXAMPLE 5

Al Corrosion in Electrolyte Containing LiTFS, DME:EC:PC and 2500 ppm of LiClO$_4$ (2/3A Cell Tests)

Cells were assembled with investigated parts and electrolytes according to the standard procedure with Al current foil applied as the cathode substrate.

The assembled cells (2/3A size) were stored 20 days at 60° C. Electrolyte removed from the cells after storage was submitted for ICP analysis. The electrolyte did not show any traces of Al, Fe, or Ni (the concentrations were at the background level).

EXAMPLE 6

Corrosion Tests Using Different Aluminum Alloys, (Vial Storage Test)

Two cathodes were prepared by coating aluminum foil substrates (1145 Al) with MnO$_2$. Pieces of aluminum foil (3003 Al) were welded to the aluminum foil of each of the cathodes. One cathode was stored for 20 days at 60° C. over LiTFS, DME:EC:PC electrolyte containing 2500 ppm of LiClO$_4$. The second cathode was stored for 20 days at 60° C. over LiTFS, DME:EC:PC electrolyte containing no LiClO$_4$. After the 20-day period, the electrolytes were analyzed by ICP. The first electrolyte (2500 ppm LiClO$_4$ in the electrolyte) contained less than 1 ppm Al, while the second electrolyte (no LiClO$_4$ in the electrolyte) contained 18 ppm Al. These results indicate that the presence of LiClO$_4$ can suppress corrosion when two different alloys of aluminum are in electrical contact in the presence of electrolyte.

Reduction of Corrosion of Steels

Addition of a perchlorate salt as described herein can also reduce (e.g., minimize or suppress) corrosion of steel, e.g., stainless steel, in a cell. Examples of steels include 300 series stainless steels (such as 304L or 316L stainless steel), 400 series stainless steels (such as 409, 416, 434, or 444 stainless steel), or cold roll steels (such as 1008 cold roll steel). Other types stainless steels, e.g., 200 series stainless steel, are possible. The steel can be included in one or more components of the cell in relatively pure form or combined with one or more other materials, such as a different stainless steel. Examples of a component of a cell include a cathode current collector, a case, a positive lead, or a cap. Accordingly, adding a perchlorate salt to the cell can reduce corrosion of the component(s). In some cases, the component(s) can include a couple, e.g., two materials in electrical contact with each other. The perchlorate salt can also reduce corrosion of couples of different materials (e.g., 316 and 416 stainless steel) and couples of the same material, because a connection portion (e.g., a weld) can have a different composition or structure than, e.g., two connected portions, due to melting and diffusion. The portions can be, for example, the cathode current collector, a tab, a rivet, the can, and/or a contact plate. As a result, in some embodiments, the cell can be operated more stably at relatively higher operating potentials, e.g., from about 3.6 V up to about 5.0 V.

EXAMPLE 7

Corrosion of Steel in an Electrolyte Containing LiTFS and DME:EC:PC

Glass Cell Experimentation

An electrochemical glass cell was constructed as described above but having a steel working electrode, which was fabricated from a rod of a selected steel.

Cyclic Voltammetry.

Corrosion current measurements were performed as described above. The corrosion potential of steel was defined as the potential at which the anodic current density reached $10^{-5}$ (or $10^{-4}$) A/cm$^2$ at the first cycle of backscan.

Chronoamperometry.

Corrosion current measurements were performed as described above. Corrosion suppression occurred when resulting current density was observed in the range of $10^{-6}$ A/cm$^2$ after 30 min. of polarization.

Figure 11:
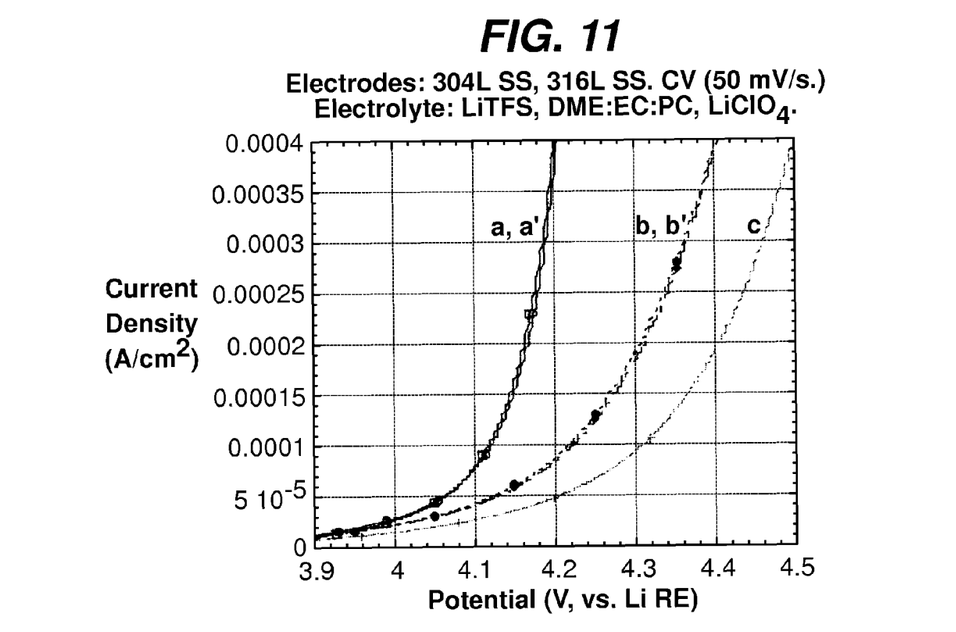
FIG. 11 is a graph showing current density vs. potential of 304 stainless steel in an electrode exposed to LiTFS, DME: EC:PC electrolytes containing no LiClO$_4$ and an amount of LiClO$_4$.

304L Stainless Steel: Referring to FIG. 11, cyclic voltammograms taken in an electrolyte containing LiTFS and DME:EC:PC showed significant shifts in corrosion potential of a 304 SS electrode. The addition of LiClO$_4$ to the electrolyte shifted the potential of 304 SS electrode in the positive direction, which indicates corrosion suppression.

Curves "a" and "a'" in FIG. 11 show the corrosion potential of the 304 SS electrode (intersection of cyclic voltammogram with $10^{-4}$ mA/cm$^2$ current density line) in the electrolyte containing no LiClO$_4$. The corrosion potential of 316L steel electrode is presented on curves "b" and "b'" as a base line. The addition of 2000 ppm of LiClO$_4$ to the electrolyte shifted the potential of the 304L electrode about 200 mV in the positive direction (curves "c" and "c'"). These results demonstrate that the addition of LiClO$_4$ to the electrolyte containing LiTFS salt and mixture of DME:EC:PC results in increasing degrees of corrosion protection of the 304L electrode.

Figure 12:
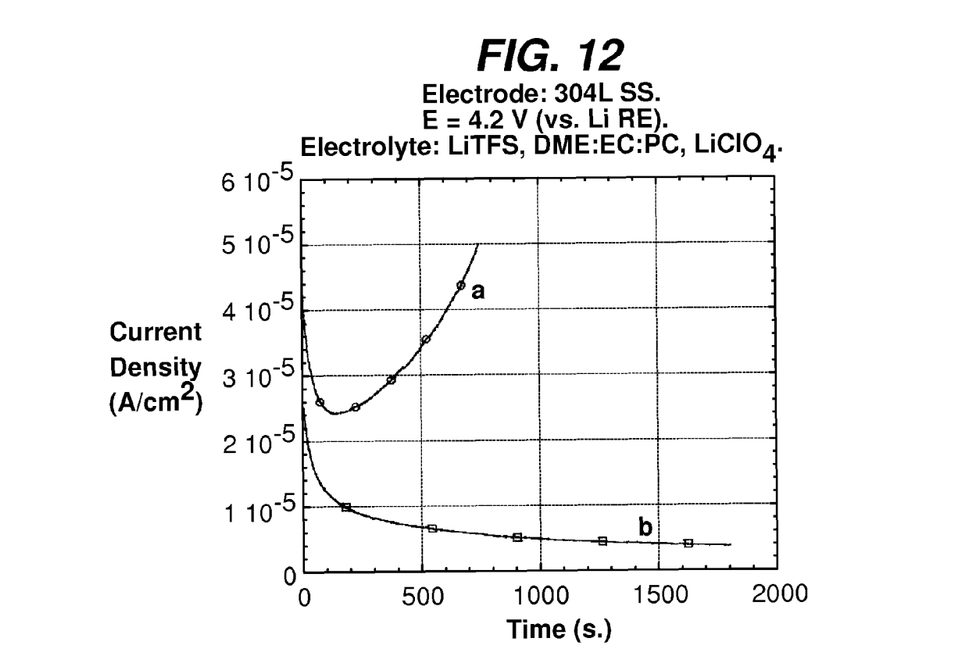
FIG. 12 is a graph showing current density vs. time of 304 stainless steel in an electrode exposed to LiTFS, DME:EC:PC electrolytes containing no LiClO$_4$ and an amount of LiClO$_4$.

Referring to FIG. 12, curve "a" shows a potentiostatic (at 4.2 V vs. Li RE) dependence (chronoamperogram) of the 304L steel electrode exposed to the electrolyte containing LiTFS, DME:EC:PC with no addition of LiClO$_4$. Curve "b" shows the chronoamperogram taken in the same electrolyte with addition of 2000 ppm LiClO$_4$. As shown in FIG. 12, at a LiClO$_4$ concentration of 2000 ppm, the 304 steel corrosion at +4.2 V (vs. Li reference electrode) is effectively suppressed, and the corrosion current is less than $10^{-6}$ A/cm$^2$ after 30 min. of measurement. A 304 steel electrode is stable at the potentials more negative than +4.2 V vs. Li RE.

Figure 13:
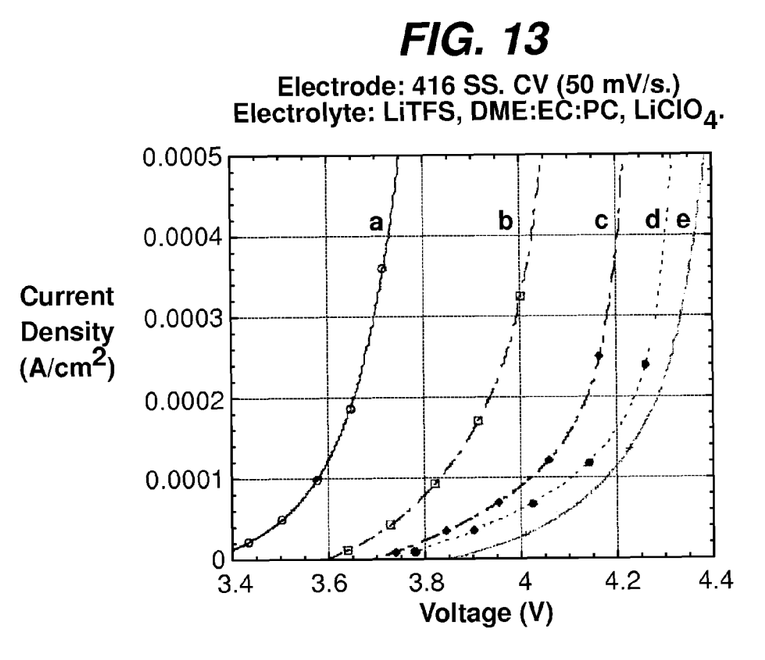
FIG. 13 is a graph showing current density vs. potential of 416 stainless steel in an electrode exposed to LiTFS, DME: EC:PC electrolytes containing different amounts of LiClO$_4$.

416L Stainless Steel: Referring to FIG. 13, curve "a" shows the corrosion potential of 416 steel electrode (intersection of the backscan cyclic voltammogram with $1\times10^{-4}$ mA/cm$^2$ current density line) in an electrolyte containing LiTFS, DME:EC:PC, and no LiClO$_4$. Adding 0.2% of LiClO$_4$ to the electrolyte shifted the corrosion potential of the 416 steel electrode 250 mV in the positive direction (curves "b"); adding 0.4% of LiClO$_4$ to the electrolyte shifted the potential 440 mV (curves "c"); and adding 0.6% and 0.8% of LiClO$_4$ to the electrolyte shifted the potential 530 and 600 mV, respectively (curves "d" and "e"). These results demonstrate that the addition of increasing amounts of LiClO$_4$ to the electrolyte containing LiTFS, and DME:EC:PC results in increasing degrees of corrosion protection of the a 416 steel electrode.

Figure 14:
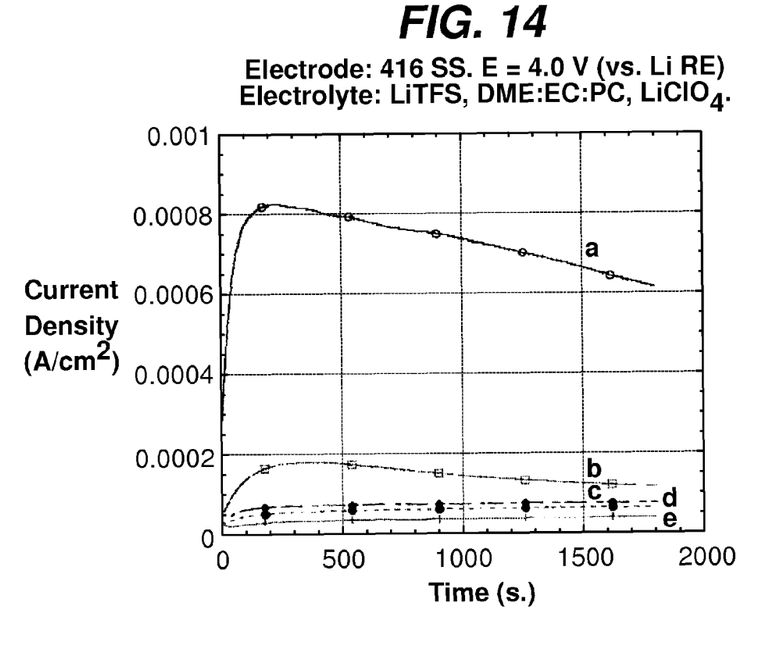
FIG. 14 is a graph showing current density vs. time of 416 stainless steel in an electrode exposed to LiTFS, DME:EC:PC electrolytes containing different amounts of LiClO$_4$.

Referring to FIG. 14, curve "a" shows a chronoamperogram of 416 steel electrode (4.0 V vs. Li RE) exposed to an electrolyte containing LiTFS, DME:EC:PC, and no LiClO$_4$. Curves "b", "c", "d", "e" show chronoamperograms of the 416 steel electrode exposed to the same electrolyte containing 0.2, 0.4, 0.6, 0.8% LiClO$_4$, respectively. As shown in FIG. 14, the addition of increasing amounts of LiClO$_4$ to the electrolyte containing LiTFS, and DME:EC:PC results in increasing degrees of corrosion protection of the 416 steel electrode. The resulting current density in the electrolyte with addition of LiClO$_4$ after 30 min. of polarization is in the range of $4*10^{-5}$ A/cm$^2$ and decreasing.

Figure 15:
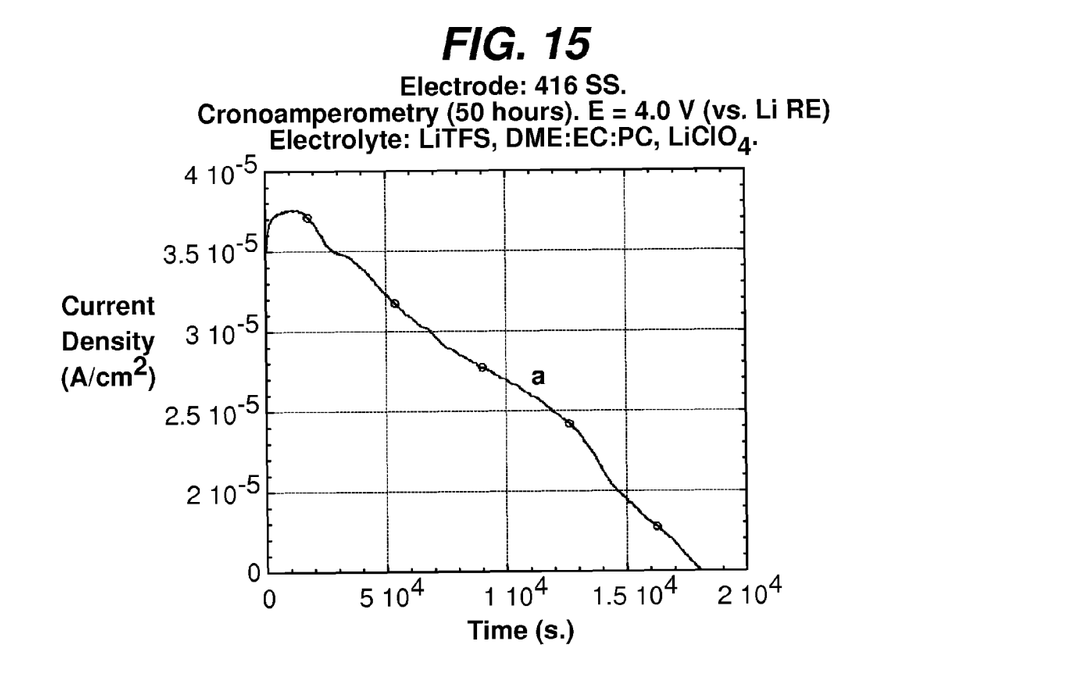
FIG. 15 is a graph showing current density vs. time of 416 stainless steel in an electrode exposed to LiTFS, DME:EC:PC electrolytes containing an amount of LiClO$_4$.

Referring to FIG. 15, curve "a" shows a chronoamperogram of a 416 steel electrode (4.0 V vs. Li RE) exposed to the electrolyte containing LiTFS, DME:EC:PC, and 0.8% of LiClO$_4$. As shown in FIG. 15, the resulting current density after 50 hours of polarization is in the range of $1.5\times10^{-5}$ A/cm$^2$ and decreasing. As shown in FIG. 15, at a LiClO$_4$ concentration of 0.8%, the corrosion of 416 steel at +4.0 V (vs. Li reference electrode) is effectively suppressed. A 416 steel electrode is stable at potentials more negative than +4.0 V vs. Li RE.

Figure 16:
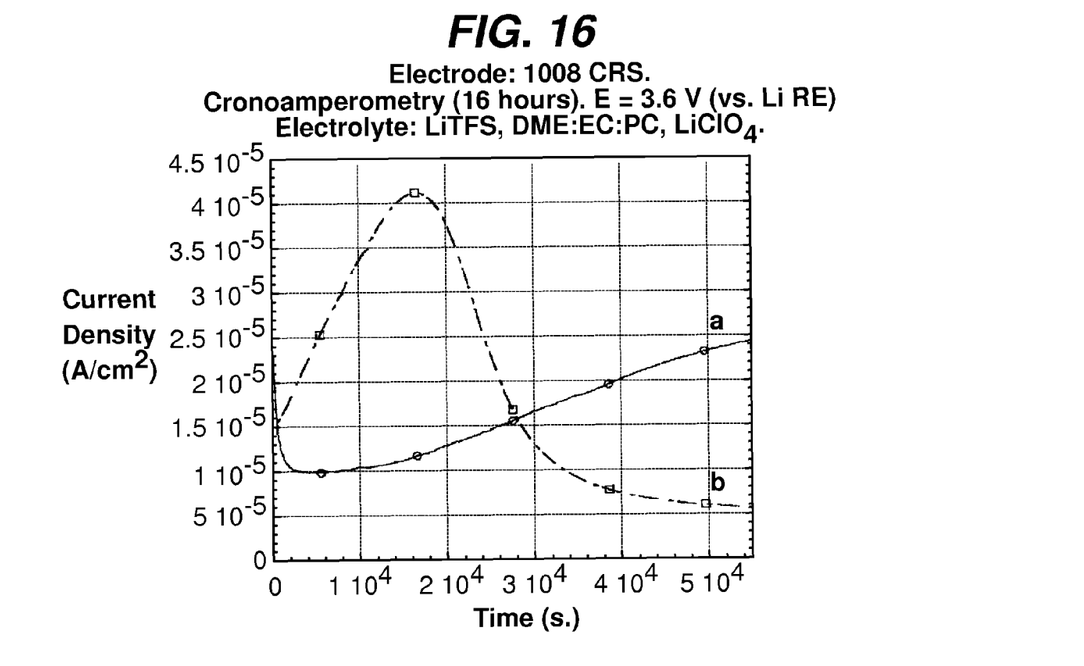
FIG. 16 is a graph a graph showing current density vs. time of cold roll steel in an electrode exposed to LiTFS, DME:EC: PC electrolytes containing different amounts of LiClO$_4$.

1008 Cold Roll Steel (CRS): Referring to FIG. 16, curve "a" shows a chronoamperogram of 1008 CRS electrode (3.6 V vs. Li RE) exposed to an electrolyte containing LiTFS, DME:EC:PC, and no LiClO$_4$. Curve "b" shows a chronoamperogram of 1008 CRS electrode exposed to the same electrolyte containing 1.0% LiClO$_4$. As shown in FIG. 16, the addition of 1.0% of LiClO$_4$ to the electrolyte containing LiTFS, and DME:EC:PC results in successful corrosion suppression of the 1008 CRS electrode. The resulting current density in the electrolyte with the addition of 1% of LiClO$_4$ after 16 hours of polarization is in the range of $1\times10^{-5}$ A/cm$^2$ and decreasing.

EXAMPLE 8

Steel Corrosion in Electrolyte Containing LiTFS, DME:EC:PC (Vial Storage Test)

The test method was generally as described in Example 6 but using steel current collectors. Direct determination of steel corrosion was performed by analytical determination of Fe ions in the electrolyte after aging (ICP method);

Stainless steel current collectors: 304 and 416 steel current collectors did not show any sign of corrosion after 20 days of storage in the electrolyte at 60° C. (background level of Fe ions in liquid phase).

CRS current collector: Direct measurements of steel corrosion were performed by determining the level of Fe ions in the electrolyte after aging of EMD based cathodes with steel current collector. The electrodes stored in the electrolyte without $LiClO_4$ exhibited substantial corrosion, as viewed under an optical microscope. A sample stored in the electrolyte with added $LiClO_4$ showed virtually no corrosion. Analytical results (ICP) are summarized in a Table 2.

TABLE 2

| Sample | Electrolyte | Fe concentration after storage (ppm) |
|---|---|---|
| None | LiTFS, DME:EC:PC | <1.0 |
| EMD based cathode on CRS current collector | LiTFS, DME:EC:PC | 17.5, 16.3 |
| EMD based cathode on CRS current collector | LiTFS, DME:EC:PC + 1.0% $LiClO_4$ | 1.1, 1.0 |

The level of Fe ions in the electrolyte indicates the rate of CRS corrosion. The Fe concentration in the electrolyte without $LiClO_4$ addition is relatively high (the range is 16-18 ppm). Thus, part of the CRS current collector has dissolved (corroded) under the potential of the applied active cathode material (3.6V). Samples that were stored in the electrolytes with added $LiClO_4$ did not show any corrosion (the resulting Fe concentration in the electrolyte is at the background level 1.0-1.1 ppm). The data (Table 2) confirm results of the electrochemical measurements in a glass cell: 1.0% of $LiClO_4$ suppresses the corrosion of CRS at the potential of EMD cathode.

All publications, patents, and patent applications referred to in this application are herein incorporated by reference to the same extent as if each individual publication, patent, or patent application was specifically and individually indicated to be incorporated by reference.

Other Embodiments

A number of embodiments of the invention have been described. Nevertheless, it will be understood that various modifications may be made without departing from the spirit and scope of the invention. For example, although the examples described above relate to batteries, the invention can be used to suppress aluminum corrosion in systems other than batteries, in which an aluminum-metal couple occurs. Other embodiments are within the scope of the following claims.

What is claimed is:

1. A primary electrochemical cell, comprising:
   a cylindrical housing having a positive end cap comprising aluminum at an end of the cylindrical housing;
   an anode comprising lithium;
   a cathode comprising manganese dioxide and/or iron disulfide;
   an electrolyte comprising a perchlorate salt, wherein the electrolyte includes between 300 ppm and 20,000 ppm of the perchlorate salt;
   a cathode current collector comprising a first aluminum alloy; and
   a positive lead, centrally located in the cylindrical housing, comprising a second aluminum alloy different from the first aluminum alloy connected to and in electrical contact with the cathode current collector and extending from the cathode current collector to the positive end cap.

2. The cell of claim 1, wherein the cathode comprises manganese dioxide.

3. The cell of claim 1, wherein the cathode comprises iron disulfide.

4. The cell of claim 1, wherein the anode comprises a lithium alloy.

5. The cell of claim 1, wherein the electrolyte includes between 500 ppm and 20,000 ppm of the perchlorate salt.

6. The cell of claim 1, wherein the electrolyte includes between 300 ppm and 10,000 ppm of the perchlorate salt.

* * * * *